United States Patent
Miura et al.

(10) Patent No.: US 11,131,586 B2
(45) Date of Patent: Sep. 28, 2021

(54) TEMPERATURE SENSOR ELEMENT

(71) Applicant: KOA Corporation, Ina (JP)

(72) Inventors: Katsuya Miura, Tokyo (JP); Masahiro Shimodaira, Tokyo (JP)

(73) Assignee: KOA Corporation, Ina (JP)

( * ) Notice: Subject to any disclaimer, the term of this patent is extended or adjusted under 35 U.S.C. 154(b) by 289 days.

(21) Appl. No.: 15/979,830

(22) Filed: May 15, 2018

(65) Prior Publication Data

US 2018/0335348 A1 Nov. 22, 2018

(30) Foreign Application Priority Data

May 16, 2017 (JP) .............................. JP2017-097520
May 16, 2017 (JP) .............................. JP2017-097590

(51) Int. Cl.
*G01K 7/18* (2006.01)
*G01K 1/10* (2006.01)
(Continued)

(52) U.S. Cl.
CPC ................. *G01K 1/10* (2013.01); *G01K 1/08* (2013.01); *G01K 7/18* (2013.01); *G01K 7/183* (2013.01);
(Continued)

(58) Field of Classification Search
CPC ...... G01K 1/10; G01K 7/183; G01K 2205/04; G01K 7/18; G01K 1/08; G01K 1/00; G01K 7/00; G01K 7/16; G01K 2205/00
See application file for complete search history.

(56) References Cited

U.S. PATENT DOCUMENTS 4,050,052 A * 9/1977 Reichelt .................. G01K 7/18
338/308
4,901,051 A * 2/1990 Murata .................... G01K 7/18
29/612

(Continued)

FOREIGN PATENT DOCUMENTS

CN 101629028 A * 1/2010
CN 102345122 A * 2/2012
(Continued)

OTHER PUBLICATIONS

Thin-film temperature sensors deposited by radio frequency cathodic sputtering Journal of Vacuum Science & Technology A 5, 2917 (1987). (Year: 1987).*
(Continued)

*Primary Examiner* — Herbert K Roberts
*Assistant Examiner* — Fatemeh Esfandiari Nia
(74) *Attorney, Agent, or Firm* — Crowell & Moring LLP

(57) ABSTRACT

A resistance pattern that contains platinum as a main component is formed into a meander shape and on a main surface of a ceramic substrate. A protective film layer that covers the resistance pattern has a two-layer structure including a trap layer as an inner layer and an overcoat layer as an outer layer. The trap layer contains alumina as a main component and 2 to 30 vol % of platinum. The overcoat layer contains alumina as a main component. With such a configuration, even when reactivity of the platinum resistance pattern becomes higher under high temperature use, platinum contained in the trap layer reacts with oxygen or impurities etc. contained in the ceramic substrate. Thus, reaction of the platinum resistance pattern can be suppressed.

4 Claims, 4 Drawing Sheets

(51) Int. Cl.
*G01K 1/08* (2021.01)
*G01N 27/407* (2006.01)
*G01N 27/12* (2006.01)

(52) U.S. Cl.
CPC ......... *G01K 2205/04* (2013.01); *G01N 27/12* (2013.01); *G01N 27/407* (2013.01); *G01N 27/4071* (2013.01); *G01N 27/4075* (2013.01); *G01N 27/4077* (2013.01)

(56) References Cited

U.S. PATENT DOCUMENTS

| | | | | |
|---|---|---|---|---|
| 5,089,293 | A * | 2/1992 | Bohara | G01K 7/183 374/E7.022 |
| 5,430,428 | A * | 7/1995 | Gerblinger | G01K 7/183 338/25 |
| 5,831,512 | A * | 11/1998 | Wienand | G01K 7/183 338/25 |
| 6,353,381 | B1 * | 3/2002 | Dietmann | G01K 7/183 338/25 |
| 6,617,956 | B1 * | 9/2003 | Zitzmann | G01K 7/183 338/25 |
| 8,183,974 | B2 * | 5/2012 | Wienand | G01K 7/183 338/25 |
| 2002/0084885 | A1 | 7/2002 | Wienand et al. | |
| 2004/0202227 | A1 * | 10/2004 | Nelson | G01K 7/18 374/208 |
| 2005/0200448 | A1 * | 9/2005 | Fujita | G01K 7/18 338/25 |
| 2006/0201918 | A1 * | 9/2006 | Awazu | H01L 21/67103 219/121.52 |
| 2009/0115567 | A1 | 5/2009 | Wienand et al. | |
| 2010/0117784 | A1 * | 5/2010 | Holoubek | G01K 7/18 338/22 R |

FOREIGN PATENT DOCUMENTS

| | | | |
|---|---|---|---|
| CN | 102732883 | A * | 10/2012 |
| JP | 11-121207 | A | 4/1999 |
| JP | 2000-81354 | A | 3/2000 |
| JP | 3493343 | B2 | 2/2004 |
| JP | 2005-292120 | A | 10/2005 |
| JP | 2009-85952 | A | 4/2009 |
| JP | 2018-194402 | A | 12/2018 |
| JP | 2018-194405 | A | 12/2018 |

OTHER PUBLICATIONS

Purvis, Andrew L., Bruce M. Warnes, The effects of platinum concentration on the oxidation resistance, of superalloys coated with single phase platinum aluminide,Surf. Coat. Technol.,2001, 146-147, 1-6. (Year: 2001).*

Japanese-language Office Action issued in Japanese Application No. 2017-097520 dated Mar. 17, 2021 with English translation (four (4) pages).

Japanese-language Office Action issued in Japanese Application No. 2017-097590 dated Mar. 17, 2021 with English translation (six (6) pages).

* cited by examiner

TEMPERATURE SENSOR ELEMENT

BACKGROUND OF THE INVENTION

1. Field of the Invention

The present invention relates to a high temperature sensor element that is, for example, used for measurement of temperature of exhaust gas or a catalyst passing through an exhaust pipe of a car. Particularly, it relates to a temperature sensor element in which a resistance pattern containing platinum as a main component is formed on a ceramic substrate.

2. Description of the Background Art

A temperature sensor is attached to an exhaust pipe or a catalyst of a car. Temperature of exhaust gas is sent as an electric signal to an engine control unit (ECU). Combustion is controlled in accordance with the electric signal sent to the ECU so that, for example, protection of any component having strict heat-resistant restriction or temperature of the catalyst can be most suitable. As a result, the exhaust gas can be purified or fuel efficiency can be improved.

As described in JP-A-11-121207, a flat plate type temperature sensor element has been known as an example of such an exhaust temperature sensor. In the configuration of the flat plate type temperature sensor element, a resistance pattern made of a platinum film is formed on an alumina substrate shaped like a rectangular parallelepiped. In addition, a pair of electrodes connected to opposite ends of the resistance pattern are formed, lead wires are bonded to the electrodes respectively and then led to the outside, and the resistance pattern is covered with a protective film layer.

In the temperature sensor element described in JP-A-11-121207, platinum that is extremely chemically stable is used as a thermosensitive film constituting the resistance pattern. Accordingly, characteristic variation hardly occurs in the thermosensitive film even under high temperature so that the sensor is suitable for a high temperature application. However, in recent years, there is a demand for a sensor that can be used even at a high operating temperature exceeding 900° C. There arises a problem that the protective film layer covering the resistance pattern may be electrochemically decomposed in such a high temperature range.

To solve this problem, the following temperature sensor element has been heretofore proposed, as described in Japanese Patent No. 3493343. In the temperature sensor element, a resistance pattern made of a platinum film is formed on a ceramic substrate, a protective intermediate layer is constituted by a ceramic layer that is vapor-deposited on a main surface of the ceramic substrate so as to cover the resistance pattern, and a ceramic paste layer that is provided on the ceramic layer, and a protective film layer is provided on the protective intermediate layer.

According to the temperature sensor element configured thus, the ceramic layer is provided under the ceramic paste layer. Even when a continuous load is applied to the protective intermediate layer having the two-layer structure in a high temperature region, the ceramic layer is unlikely to crack while the ceramic paste layer is likely to crack. Due to the provision of the ceramic layer, the protective film layer can be always separated from the platinum resistance pattern even if the protective film layer permeates the ceramic paste layer. Thus, the protective film layer can be prevented from being electrochemically decomposed.

In order to promote sintering, prevent abnormal crystal growth or attain characteristic improvement, etc., a sintering aid of $SiO_2$, CaO, BaO, MgO, ZnO, $B_2O_3$, or the like, is added to an alumina substrate that is broadly used as a ceramic substrate of such a temperature sensor element. However, platinum that is a material of a resistance pattern formed on the alumina substrate has high reactivity under high temperature. Particularly when the high temperature becomes equal to or higher than 900° C., impurities such as oxygen in a measurement atmosphere, the sintering aid contained in the alumina substrate, etc. are diffused into the resistance pattern. The impurities react with platinum of the resistance pattern or enter crystal grain boundaries of platinum. Therefore, there is a problem that the impurities may cause drift of a resistance value or change of a TCR (Temperature Coefficient of Resistance).

In the temperature sensor element described in Japanese Patent No. 3493343, the resistance pattern that is made of the platinum film is covered with the ceramic layer in the two-layer structure. Accordingly, the protective film layer is separated from the resistance pattern so that the protective film layer can be prevented from being electrochemically decomposed. Since the ceramic layer formed by the vapor deposition is in an amorphous state, it is impossible to use the ceramic layer to prevent the impurities from being diffused into the resistance pattern to suppress reaction of the impurities with platinum of the resistance pattern or entry of the impurities into the crystal grain boundaries of platinum. In addition, when the alumina substrate is used as the ceramic substrate, it is impossible to suppress reaction of platinum of the resistance pattern with the impurities such as the sintering aid contained in the alumina substrate. Accordingly, this also leads to the problem that the impurities may cause drift of the resistance value or change of the TCR.

Incidentally, it is also considered that a single crystal sapphire substrate having a small amount of impurities may be used as the ceramic substrate in place of the alumina substrate. In this case, there is however a problem that the platinum resistance pattern may be peeled from the sapphire substrate for reasons such as a large variation in linear expansion coefficient between platinum of the resistance pattern and the sapphire substrate, a decrease in adhesive strength of the resistance pattern to the sapphire substrate small in surface roughness, etc.

SUMMARY OF THE INVENTION

The invention has been accomplished in consideration of such actual circumstances of the background art. An object of the invention is to provide a temperature sensor element in which drift of a resistance value or change of a TCR can be hardly caused even under high temperature use.

As a configuration to attain the aforementioned object, the temperature sensor element according to the invention is a temperature sensor element including: a ceramic substrate; a resistance pattern that contains platinum as a main component, and that is formed on a main surface of the ceramic substrate; and a protective film layer that covers the resistance pattern; wherein: the protective film layer includes: a trap layer that contains alumina as a main component, and that is formed on the main surface of the ceramic substrate so as to cover the resistance pattern; and an overcoat layer that contains alumina as a main component, and that is formed on the trap layer; and the trap layer contains 2 to 30 vol % of platinum.

In the temperature sensor element configured thus, the protective film layer covering the platinum resistance pattern on the ceramic substrate includes: the trap layer as an inner layer that contains alumina as the main component and 2 to 30 vol % of platinum; and the overcoat layer as an outer layer that contains alumina as the main component. Accordingly, even when reactivity of the platinum resistance pattern becomes higher under high temperature use, platinum contained in the trap layer reacts with oxygen or impurities etc. contained in the ceramic substrate so that reaction of the platinum resistance pattern can be suppressed. Accordingly, it is possible to realize a highly reliable sensor in which drift of a resistance value or change of a TCR can be suppressed.

In addition, as another configuration to attain the aforementioned object, the temperature sensor element according to the invention is a temperature sensor element including: a ceramic substrate; a surface smoothening layer that contains alumina as a main component, and that is formed on a main surface of the ceramic substrate; a resistance pattern that contains platinum as a main component, and that is formed on the surface smoothening layer; and a protective film layer that contains alumina as a main component, and that covers the resistance pattern; wherein: the protective film layer includes: a trap layer that is formed on the surface smoothening layer so as to cover the resistance pattern; and an overcoat layer that is formed on the trap layer; and both the surface smoothening layer and the trap layer contain 2 to 30 vol % of platinum.

In the temperature sensor element configured thus, the surface smoothening layer containing alumina as the main component and 2 to 30 vol % of platinum is formed on the main surface of the ceramic substrate, and the protective film layer that is formed on the surface smoothening layer to cover the platinum resistance pattern includes the trap layer as an inner layer that contains alumina as the main component and 2 to 30 vol % of platinum, and the overcoat layer as an outer layer that contains alumina as the main component. Accordingly, even when reactivity of the platinum resistance pattern becomes higher under high temperature use, platinum contained in both the surface smoothening layer and the trap layer reacts with oxygen or impurities contained in the ceramic substrate so that reaction of the platinum resistance pattern can be suppressed. Particularly, reaction between the impurities contained in the ceramic substrate and the platinum resistance pattern can be suppressed due to the surface smoothening layer. Accordingly, it is possible to realize a highly reliable sensor in which drift of a resistance value or change of a TCR can be suppressed more greatly.

In the temperature sensor element having one of the aforementioned configurations, the trap layer has a two-layer structure including a lower layer and an upper layer; the lower layer is smaller in content of platinum than the upper layer and contains 0 to 10 vol % of platinum; and the upper layer contains 2 to 30 vol % of platinum. Since the lower layer is smaller in the content of platinum than the upper layer, the lower layer is sandwiched between the upper layer of the trap layer and the platinum resistance pattern, it is possible to increase the amount of platinum contained in the upper layer while using the lower layer to suppress change of the resistance value caused by platinum contained in the trap layer.

In addition, in the temperature sensor element having one of the aforementioned configurations, preferably, the ceramic substrate is an alumina substrate whose alumina purity is 96% or higher; and the trap layer is larger in content of platinum than the sum of impurities contained in the alumina substrate and impurities contained in the protective film layer except alumina and platinum.

According to the temperature sensor element of the invention, it is possible to prevent drift of the resistance value or change of the TCR caused by reaction of the platinum resistance pattern or entry of the impurities into grain boundaries under high temperature use.

DETAILED DESCRIPTION OF THE INVENTION

First Embodiment

Figure 1:
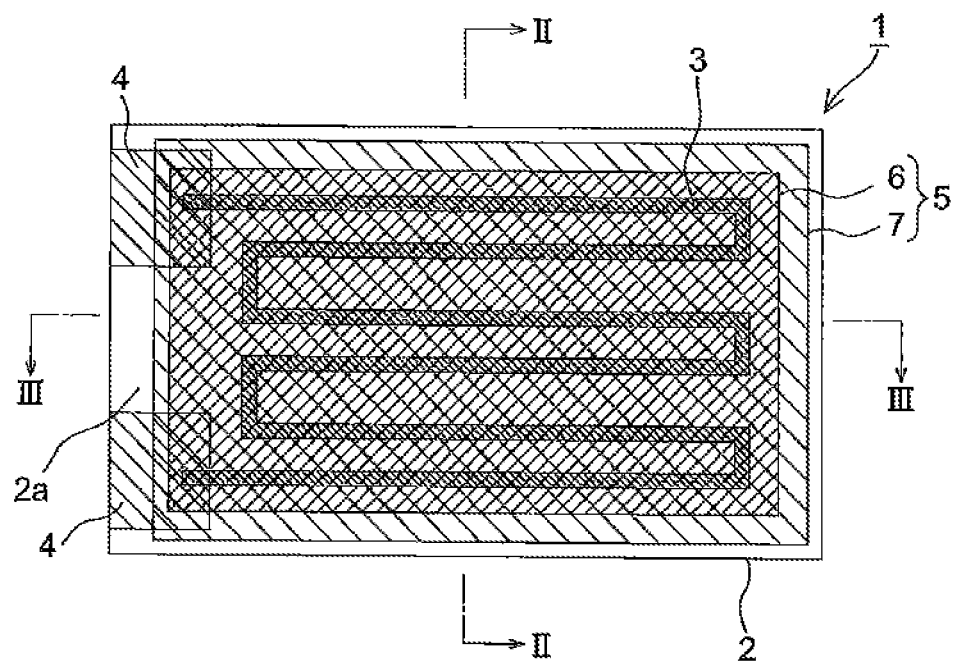
FIG. 1 is a plan view of a temperature sensor element according to a first embodiment of the invention.
Figure 2:
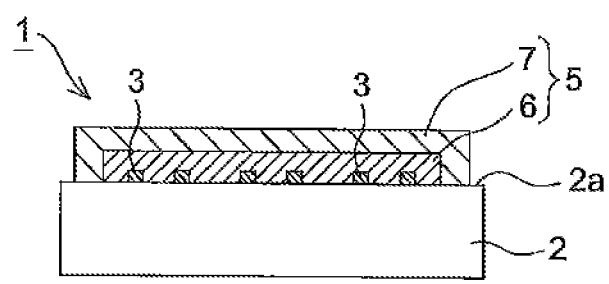
FIG. 2 is a sectional view taken along a line II-II of FIG. 1.
Figure 3:
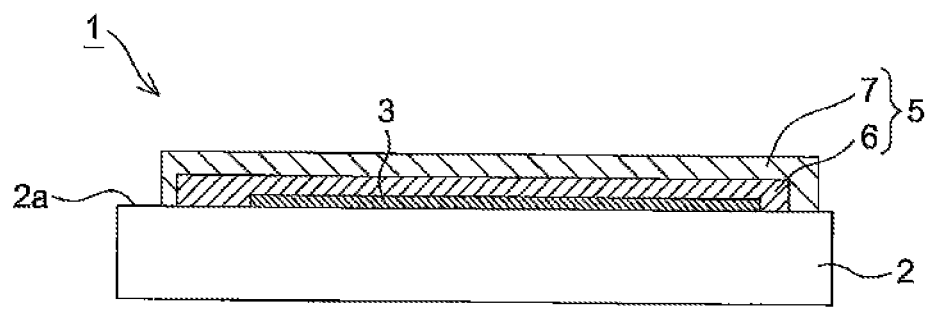
FIG. 3 is a sectional view taken along a line III-III of FIG. 1.

Embodiments of the invention will be described with reference to the drawings. Incidentally, in the following description, portions the same or regarded as the same in each of the embodiments will be referred to by the same signs correspondingly and respectively, and duplicated description thereof will be omitted appropriately. As shown in FIGS. 1 to 3, a temperature sensor element 1 according to a first embodiment of the invention is configured to include a ceramic substrate 2, a resistance pattern 3, a pair of electrodes 4, a protective film layer 5, and not-shown lead wires. The ceramic substrate 2 is shaped like a rectangular parallelepiped. The resistance pattern 3 having a meander shape is formed on a main surface (front surface) 2a of the ceramic substrate 2. The pair of electrodes 4 are formed on the main surface 2a of the ceramic substrate 2 so as to be connected to opposite end portions of the resistance pattern 3. The protective film layer 5 covers the resistance pattern 3. The lead wires are bonded on the pair of electrodes 4 and then protrude outward from the ceramic substrate 2.

The ceramic substrate 2 is an alumina substrate whose alumina purity is 96% or higher. In the ceramic substrate (alumina substrate) 2, a sintering aid of $SiO_2$, MgO, or the like is added to alumina ($Al_2O_3$) that is a main component.

The resistance pattern 3 is a thin resistive film containing platinum (Pt) as a main component. The resistance pattern 3 is formed by sputtering and patterning Pt into a meander shape on the main surface 2a of the ceramic substrate 2.

The pair of electrodes 4 are obtained by screen-printing, drying and sintering an electrode paste containing platinum as a main component. In the case of the embodiment, the pair of electrodes 4 are both disposed on portions of an illustrated left short side of the ceramic substrate 2. However, the pair of electrodes 4 may be distributed and disposed on longitudinally opposite end portions of the ceramic substrate 2.

The protective film layer 5 has a two-layer structure including a trap layer 6 and an overcoat layer 7. The trap layer 6 is formed on the main surface 2a of the ceramic substrate 2 so as to cover the resistance pattern 3. The overcoat layer 7 is formed on the trap layer 6. The trap layer 6 is obtained by screen-printing, drying and sintering an alumina paste containing platinum. The content of platinum relative to alumina that is amain component is 2 to 30 vol %. The overcoat layer 7 is obtained by screen-printing, drying and sintering an alumina paste. Platinum is not contained in the overcoat layer 7.

Incidentally, a pair of the not-shown lead wires are, for example, nickel-core platinum-clad wires. These lead wires are bonded on the corresponding electrodes 4 by welding.

Next, manufacturing steps of the temperature sensor element 1 configured thus will be described. First, a large-sized substrate (e.g. alumina purity of 99%) from which a large number of ceramic substrates 2 can be obtained is prepared. Primary division grooves and secondary division grooves are provided in the large-sized substrate to forma grid pattern in advance. Each of grids defined by the two division grooves is a chip region corresponding to one temperature sensor element 1.

After a film of platinum (Pt) is sputter-deposited on a front surface of the large-sized substrate, the Pt film is patterned by photolithography. Thus, a meander-shaped resistance pattern 3 is formed in each chip region on the large-sized substrate.

Next, an electrode paste containing platinum is screen-printed on the front surface of the large-sized substrate, dried and then sintered at a high temperature of about 1,400° C. Thus, electrodes 4 connected to opposite end portions of the resistance pattern 3 are formed.

Next, an alumina paste containing 2 to 30 vol % of platinum (e.g. 90 vol % of alumina and 10 vol % of platinum) is screen-printed on the front surface of the large-sized substrate, dried and then sintered at a high temperature equal to or higher than 1,400° C. Thus, a trap layer 6 covering the resistance pattern 3 is formed in each chip region on the large-sized substrate. The trap layer 6 makes tight contact with the front surface of the large-sized substrate exposed surrounding the resistance pattern 3. Places at each of which the resistance pattern 3 and the electrode 4 are connected to each other are also covered with the trap layer 6.

Next, an alumina paste is screen-printed from above the trap layer 6, dried and then sintered at a high temperature equal to or higher than 1,400° C. Thus, an overcoat layer 7 covering the trap layer 6 is formed. As a result, a protective film layer 5 having a two-layer structure including the trap layer 6 as an inner layer and the overcoat layer 7 as an outer layer is formed. The trap layer 6 contains alumina as a main component and 2 to 30 vol % of platinum. The overcoat layer 7 contains alumina as a main component but does not contain platinum.

The respective steps described so far are carried out by batch processing on the large-sized substrate from which the large number of the ceramic substrates 2 can be obtained. However, in a next step, the large-sized substrate is divided along the primary division grooves and the secondary division grooves and separated into individual chips. Thus, each of the single chips equivalent in size to the ceramic substrate 2 is obtained. Then, lead wires are welded to the electrodes 4 of the individually separated single chip, and places where the lead wires are welded are covered with a reinforced film of potting glass etc. Thus, a temperature sensor element 1 shown in FIGS. 1 to 3 is obtained.

In the temperature sensor element 1 according to the first embodiment, as described above, the protective film layer 5 covering the resistance pattern 3 made of the platinum film has the two-layer structure including the trap layer 6 and the overcoat layer 7. The overcoat layer 7 as the outer layer is formed out of alumina not containing platinum. In addition, the trap layer 6 as the inner layer covering the resistance pattern 3 and making tight contact with the main surface 2a of the ceramic substrate 2 contains alumina as the main component and 2 to 30 vol % of platinum. Accordingly, platinum contained in the trap layer 6 reacts with oxygen in a measurement atmosphere or impurities etc. contained in the ceramic substrate 2, for example, even under use at a high temperature equal to or higher than 1,000° C. Thus, reaction of the platinum resistance pattern 3 with the oxygen in the measurement atmosphere or the impurities etc. of the ceramic substrate 2 is relaxed. As a result, drift of a resistance value or change of a TCR caused by the reaction of the platinum resistance pattern 3 can be suppressed.

When the content of platinum in the trap layer 6 is less than 2 vol % here, the trap layer 6 can hardly function to suppress reaction of the platinum resistance pattern 3. On the contrary, when the content of platinum in the trap layer 6 exceeds 30 vol %, the resistance value of the platinum resistance pattern 3 decreases largely due to platinum contained in the trap layer 6. Therefore, the content of platinum added into the trap layer 6 containing alumina as the main component is 2 to 30 vol % in the temperature sensor element 1 according to the first embodiment.

Second Embodiment

Figure 4:
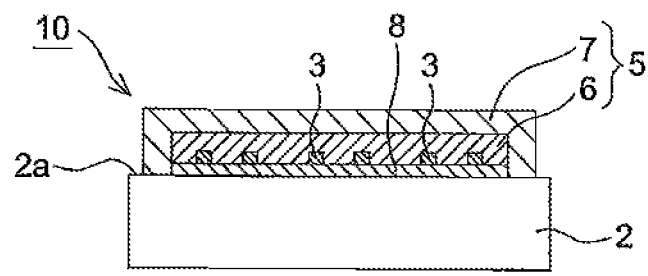
FIG. 4 is a sectional view of a temperature sensor element according to a second embodiment of the invention.

FIG. 4 is a sectional view of a temperature sensor element 10 according to a second embodiment of the invention. In FIG. 4, portions corresponding to those in FIG. 2 will be referred to by the same signs respectively.

The temperature sensor element 10 according to the second embodiment is basically the same in configuration as the temperature sensor element 1 according to the first embodiment except that a platinum resistance pattern 3 is not formed on a main surface 2a of a ceramic substrate 2 but a surface smoothening layer 8 containing alumina as a main component and 2 to 30 vol % of platinum is sandwiched between the platinum resistance pattern 3 and the main surface 2a of the ceramic substrate 2.

That is, in the temperature sensor element 10 shown in FIG. 4, the surface smoothening layer 8 containing alumina as the main component and platinum (whose content is 2 to 30 vol %) is formed on the main surface 2a of the ceramic substrate 2, and the resistance pattern 3 made of a platinum film is formed on the surface smoothening layer 8. In addition, a protective film layer 5 having a two-layer structure is formed by a trap layer 6 as an inner layer and an overcoat layer 7 as an outer layer. The trap layer 6 covers the resistance pattern 3. The overcoat layer 7 covers the trap layer 6. As a result, the structure is formed in such a manner that the resistance pattern 3 is sandwiched between the surface smoothening layer 8 containing platinum and the trap layer 6, and a peripheral edge portion of the overcoat layer 7 makes tight contact with the main surface 2a of the ceramic substrate 2 exposed surrounding the surface smoothening layer 8.

In the temperature sensor element 10 configured thus according to the second embodiment, the surface smoothening layer 8 containing alumina as the main component and 2 to 30 vol % of platinum is formed on the main surface 2a of the ceramic substrate 2, and the protective film layer 5 covering the platinum resistance pattern 3 formed on the surface smoothening layer 8 includes the trap layer 6 as the inner layer containing alumina as a main component and 2 to 30 vol % of platinum, and the overcoat layer 7 as the outer layer containing alumina as a main component. Accordingly, even when reactivity of the platinum resistance pattern 3 becomes higher under high temperature use, platinum contained in both the surface smoothening layer 8 and the trap layer 6 reacts with oxygen or impurities contained in the ceramic substrate due to the structure in which the platinum resistance pattern 3 is entirely covered with the surface smoothening layer 8 and the trap layer 6 both of which contain alumina as the main component and 2 to 30 vol % of platinum. As a result, reaction of the platinum resistance pattern 3 is suppressed so that drift of a resistance value or change of a TCR can be prevented.

Third Embodiment

Figure 5:
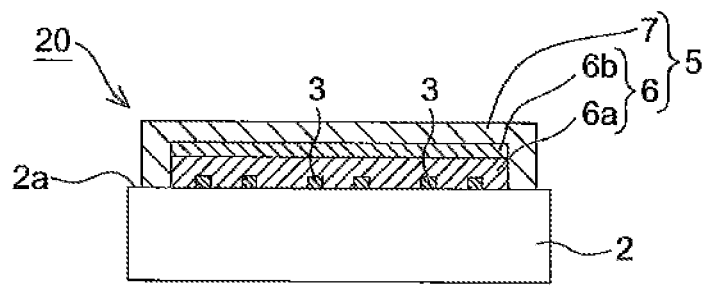
FIG. 5 is a sectional view of a temperature sensor element according to a third embodiment of the invention.

FIG. 5 is a sectional view of a temperature sensor element 20 according to a third embodiment of the invention. In FIG. 5, portions corresponding to those in FIG. 2 will be referred to by the same signs respectively.

The temperature sensor element 20 according to the third embodiment is basically the same in configuration as the temperature sensor element 1 according to the first embodiment except that, of an overcoat layer 7 and a trap layer 6 constituting a protective film layer 5, the trap layer 6 is formed into a two-layer structure including a lower layer 6a and an upper layer 6b. Here, alumina is used as a main component in both the lower layer 6a and the upper layer 6b. The lower layer 6a making contact with the platinum resistance pattern 3 is smaller in content of platinum than the upper layer 6b and contains 0 to 10 vol % of platinum. The upper layer 6b contains 2 to 30 vol % of platinum. That is, when, for example, the content of platinum in the lower layer 6a is 5 vol %, it will go well if the content of platinum in the upper layer 6b is 5 to 30 vol %. When the lower layer 6a does not contain platinum at all, it will go well if the content of platinum in the upper layer 6b is 2 to 30 vol %.

In the temperature sensor element 20 configured thus according to the third embodiment, the lower layer 6a smaller in content of platinum than the upper layer 6b is sandwiched between the upper layer 6b of the trap layer 6 and the platinum resistance pattern 3. Accordingly, while change of a resistance value caused by platinum contained in the trap layer 6 is suppressed due to the lower layer 6a, the amount of platinum contained in the upper layer 6b is increased so that reaction of the platinum resistance pattern 3 can be suppressed more effectively.

Fourth Embodiment

Figure 6:
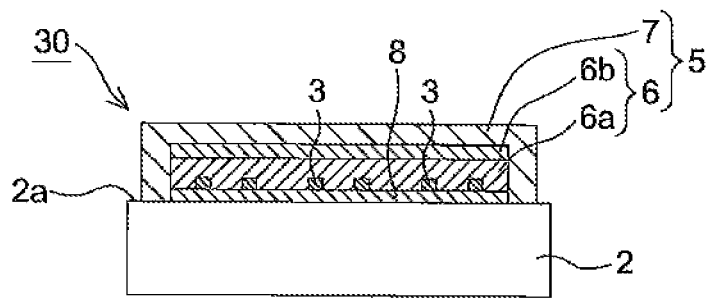
FIG. 6 is a sectional view of a temperature sensor element according to a fourth embodiment of the invention.

FIG. 6 is a sectional view of a temperature sensor element 30 according to a fourth embodiment of the invention. In FIG. 6, portions corresponding to those in FIG. 5 will be referred to by the same signs respectively.

The temperature sensor element 30 according to the fourth embodiment is basically the same in configuration as the temperature sensor element 20 according to the third embodiment except that a platinum resistance pattern 3 is not formed on a main surface 2a of a ceramic substrate 2 but a surface smoothening layer 8 containing alumina as a main component and 2 to 30 vol % of platinum is sandwiched between the platinum resistance pattern 3 and the main surface 2a of the ceramic substrate 2.

That is, in the temperature sensor element 30 shown in FIG. 6, the surface smoothening layer 8 containing alumina as the main component and platinum (whose content is 2 to 30 vol %) is formed on the main surface 2a of the ceramic substrate 2, and the resistance pattern 3 made of a platinum film is formed on the surface smoothening layer 8. In addition, of a protective film layer 5 including a trap layer 6 covering the resistance pattern 3 and an overcoat layer 7, the trap layer 6 is formed into a two-layer structure including a lower layer 6a and an upper layer 6b. As a result, the structure is formed in such a manner that the lower layer 6a smaller in content of platinum than the upper layer 6b of the trap layer 6 is sandwiched between the upper layer 6b and the platinum resistance pattern 3, and the platinum resistance pattern 3 is sandwiched between the lower layer 6a and the surface smoothening layer 8 containing platinum.

In the temperature sensor element 30 configured thus according to the fourth embodiment, even when reactivity of the platinum resistance pattern 3 becomes higher under high temperature use, platinum contained in both the surface smoothening layer 8 and the trap layer 6 reacts with oxygen or impurities etc. contained in the ceramic substrate 2. Thus, reaction of the platinum resistance pattern 3 is suppressed so that drift of a resistance value or change of a TCR can be prevented. Moreover, the trap layer 6 has the two-layer structure including the lower layer 6a and the upper layer 6b both containing alumina as a main component, and the lower layer 6a smaller in content of platinum than the upper layer 6b is sandwiched between the upper layer 6b and the platinum resistance pattern 3. Accordingly, while change of the resistance value caused by platinum contained in the trap layer 6 is suppressed due to the lower layer 6a, the amount of platinum contained in the upper layer 6b is increased so that reaction of the platinum resistance pattern 3 can be suppressed more effectively.

Fifth Embodiment

Figure 7:
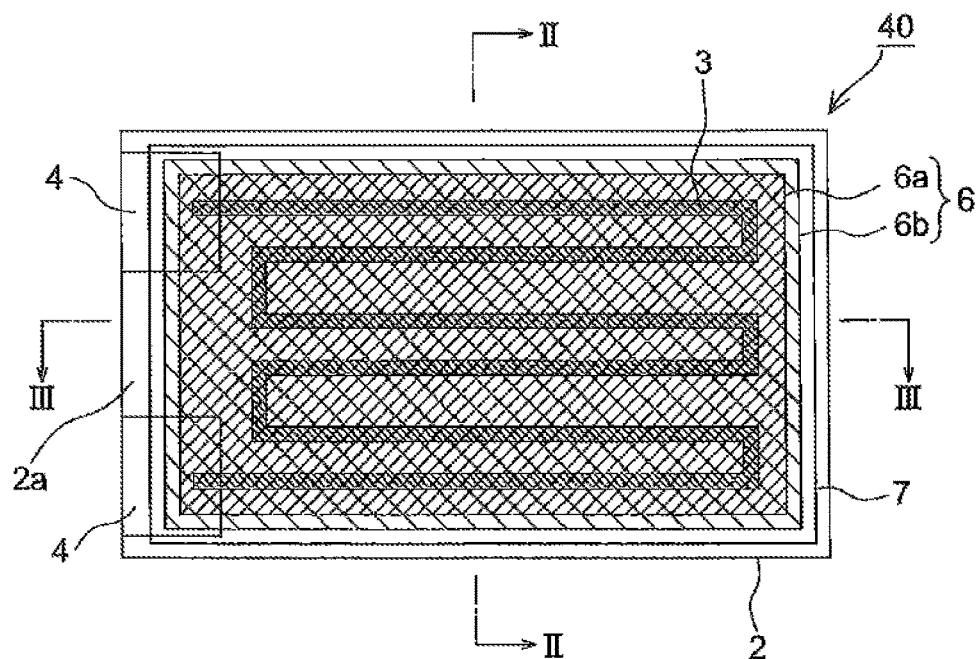
FIG. 7 is a plan view of a temperature sensor element according to a fifth embodiment of the invention.
Figure 8:
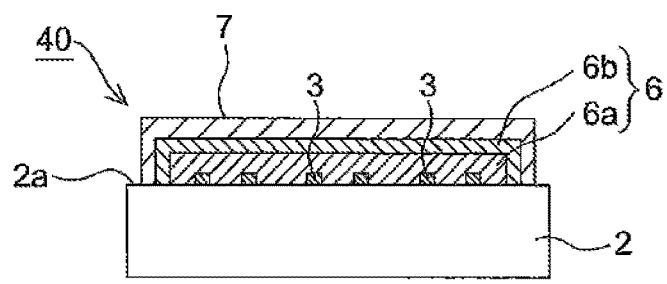
FIG. 8 is a sectional view taken along a line II-II of FIG. 7.
Figure 9:
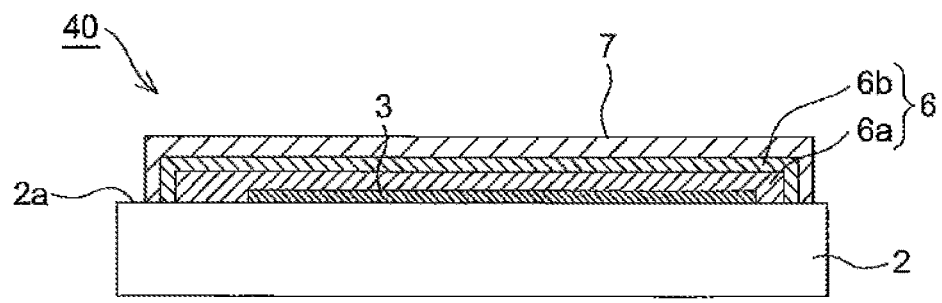
FIG. 9 is a sectional view taken along a line III-III of FIG. 8.

As shown in FIGS. 7 to 9, a temperature sensor element 40 according to a fifth embodiment of the invention is provided with a ceramic substrate 2, a resistance pattern 3, a pair of electrodes 4, a trap layer 6, an overcoat layer 7, and not-shown lead wires. The ceramic substrate 2 is shaped like a rectangular parallelepiped. The resistance pattern 3 having a meander shape is formed on a main surface (front surface) 2a of the ceramic substrate 2. The pair of electrodes 4 are formed on the main surface 2a of the ceramic substrate 2 so as to be connected to opposite end portions of the resistance pattern 3. The trap layer 6 covers the resistance pattern 3. The overcoat layer 7 covers the trap layer 6. The lead wires are bonded on the pair of electrodes 4 and then protrude outward from the ceramic substrate 2. A protective film layer 5 is constituted by the trap layer 6 and the overcoat layer 7. Incidentally, in the fifth embodiment, portions corresponding to those in the first embodiment will be referred to by the same signs respectively.

The ceramic substrate 2, the resistance pattern 3, the pair of electrodes 4, the overcoat layer 7 and the lead wires are the same in configuration as those in the first embodiment. In addition, the overcoat layer 7 covers the whole of an upper layer 6b, and a peripheral edge portion of the overcoat layer 7 makes tight contact with the main surface 2a of the ceramic substrate 2.

The trap layer 6 is formed into a two-layer structure including a lower layer 6a and the upper layer 6b. The lower layer 6a covers the resistance pattern 3 and makes tight contact with the main surface 2a of the ceramic substrate 2. The upper layer 6b covers the lower layer 6a. A peripheral edge portion of the upper layer 6b makes tight contact with the main surface 2a of the ceramic substrate 2. The lower layer 6a and the upper layer 6b are obtained by screen-printing, drying and sintering an alumina paste containing alumina as amain component. The content of platinum relative to alumina that is the main component varies between the lower layer 6a and the upper layer 6b. The relation about the content of platinum between the lower layer 6a and the upper layer 6b is similar to or the same as that in the aforementioned third embodiment.

Next, manufacturing steps of the temperature sensor element 40 configured thus will be described. First, a large-sized substrate (e.g. alumina purity of 99%) from which a large number of ceramic substrates 2 can be obtained is prepared. Primary division grooves and secondary division grooves are provided in the large-sized substrate to forma grid pattern in advance. Each of grids defined by the two division grooves is a chip region corresponding to one temperature sensor element 1.

After a film of platinum (Pt) is sputter-deposited on a front surface of the large-sized substrate, the Pt film is patterned by photolithography. Thus, a meander-shaped resistance pattern 3 is formed in each chip region on the large-sized substrate.

Next, an electrode paste containing platinum is screen-printed on the front surface of the large-sized substrate, dried and then sintered at a high temperature of about 1,400° C. Thus, electrodes 4 connected to opposite end portions of the resistance pattern 3 are formed.

Next, an alumina paste containing 0 to 10 vol % of platinum (e.g. 98 vol % of alumina and 2 vol % of platinum) is screen-printed on the front surface of the large-sized substrate, dried and then sintered at a high temperature equal to or higher than 1,400° C. Thus, a lower layer 6a covering the resistance pattern 3 is formed in each chip region on the large-sized substrate. The lower layer 6a makes tight contact with the front surface of the large-sized substrate exposed surrounding the resistance pattern 3. Places at each of which the resistance pattern 3 and the electrode 4 are connected to each other are also covered with the lower layer 6a.

Next, an alumina paste containing 2 to 30 vol % of platinum (e.g. 90 vol % of alumina and 10 vol % of platinum) is screen-printed from above the lower layer 6a, dried and then sintered at a high temperature equal to or higher than 1,400° C. Thus, an upper layer 6b covering the whole of the lower layer 6a is formed. The upper layer 6b makes tight contact with the front surface of the large-sized substrate exposed outside the lower layer 6a. A trap layer 6 is formed by the lower layer 6a and the upper layer 6b.

Next, an alumina paste is screen-printed from above the upper layer 6b, dried and then sintered at a high temperature equal to or higher than 1,400° C. Thus, an overcoat layer 7 covering the trap layer 6 is formed. As a result, a protective film layer 5 having a lamination structure including the trap layer 6 as an inner layer and the overcoat layer 7 as an outer layer is formed. The trap layer 6 (the lower layer 6a and the upper layer 6b) contains alumina as a main component and 2 to 30 vol % of platinum. The overcoat layer 7 contains alumina as a main component but does not contain platinum.

The respective steps described so far are carried out by batch processing on the large-sized substrate from which the large number of the ceramic substrates 2 can be obtained.

However, in a next step, the large-sized substrate is divided along the primary division grooves and the secondary division grooves and separated into individual chips. Thus, each of the single chips equivalent in size to the ceramic substrate 2 is obtained. Then, lead wires are welded to the electrodes 4 of the individually separated single chip, and places where the lead wires are welded are covered with a reinforced film of potting glass etc. Thus, a temperature sensor element 40 shown in FIGS. 7 to 9 is obtained.

In the temperature sensor element 40 according to the fifth embodiment, as described above, the trap layer 6 covered with the overcoat layer 7 has the two-layer structure including the lower layer 6a and the upper layer 6b. The lower layer 6a covers the resistance pattern 3 and makes tight contact with the main surface 2a of the ceramic substrate 2. The upper layer 6b covers the lower layer 6a and makes tight contact with the main surface 2a of the ceramic substrate 2. The upper layer 6b is formed out of a material containing alumina as the main component and 2 to 30 vol % of platinum, and the lower layer 6a is formed out of a material containing alumina as the main component and 0 to 10 vol % of platinum. Accordingly, even when reactivity of the platinum resistance pattern 3 becomes higher under high temperature use, platinum contained in the lower layer 6a or the upper layer 6b reacts with oxygen or impurities etc. of the ceramic substrate so that reaction of the platinum resistance pattern 3 can be suppressed. As a result, it is possible to realize a highly reliable sensor in which drift of a resistance value or change of a TCR can be prevented.

When the content of platinum in the whole of the trap layer 6 including the lower layer 6a and the upper layer 6b is less than 2 vol % here, the trap layer 6 can hardly function to suppress reaction of the platinum resistance pattern 3. On the contrary, when the content of platinum in the trap layer 6 is large, the resistance value of the platinum resistance pattern 3 decreases due to platinum contained in the trap layer 6. When the content of platinum in the trap layer 6 exceeds 30 vol %, electric continuity is established due to platinum contained in the trap layer 6 so that the resistance value decreases largely. In the configuration of the temperature sensor element 40 according to the fifth embodiment, the lower layer 6a smaller in content of platinum than the upper layer 6b is sandwiched between the upper layer 6b and the platinum resistance pattern 3. Accordingly, in the state in which the decrease of the resistance value of the platinum resistance pattern 3 has been suppressed due to the lower layer 6a, the amount of platinum contained in the upper layer 6b is increased so that reaction of the platinum resistance pattern 3 can be suppressed more effectively.

Sixth Embodiment

Figure 10:
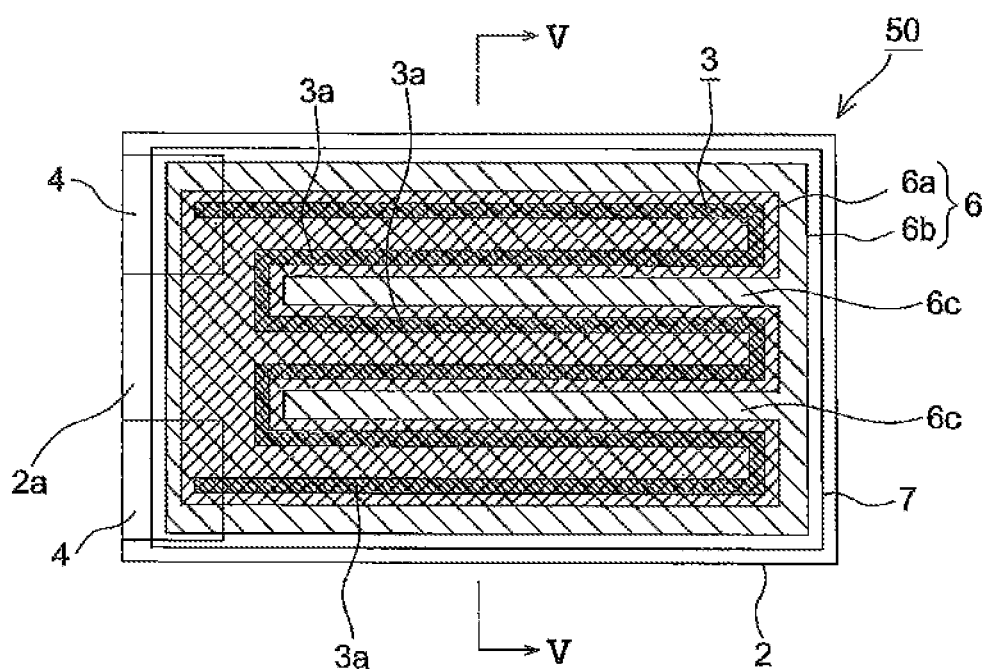
FIG. 10 is a plan view of a temperature sensor element according to a sixth embodiment of the invention.
Figure 11:
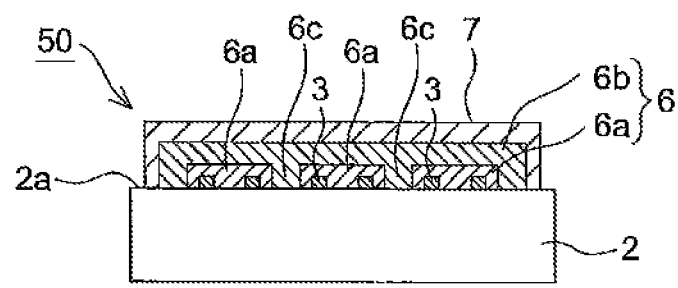
FIG. 11 is a sectional view taken along a line V-V of FIG. 10.

FIG. 10 is a plan view of a temperature sensor element 50 according to a sixth embodiment of the invention. FIG. 11 is a sectional view taken along a line V-V of FIG. 10. In FIGS. 10 and 11, portions corresponding to those in FIGS. 7 to 9 will be referred to by the same signs respectively.

The temperature sensor element 50 according to the sixth embodiment is basically the same in configuration as the temperature sensor element 40 according to the fifth embodiment except that a lower layer 6a has notch portions 6c each positioned between adjacent ones of meandering conductor portions of a meander-shaped resistance pattern 3, and an upper layer 6b passes the notch portions 6c and makes tight contact with a main surface 2a of a ceramic substrate 2.

That is, in the temperature sensor element 50 shown in FIGS. 10 and 11, the resistance pattern 3 is formed into a meander shape having three meandering conductor portions 3a. The lower layer 6a covering the resistance pattern 3 is formed into a comb shape (the shape of an alphabet "E") having two notch portions 6c each going into adjacent ones of the meandering conductor portions 3a. In addition, the upper layer 6b that is shaped like a rectangle in plan view and that covers the lower layer 6a makes tight contact with the main surface 2a of the ceramic substrate 2 not only at a peripheral edge portion but also inside the notch portions 6c.

Also in the temperature sensor element 50 configured thus according to the sixth embodiment, the lower layer 6a smaller in content of platinum than the upper layer 6b of a trap layer 6 is sandwiched between the upper layer 6b and the platinum resistance pattern 3. Accordingly, in the state in which a decrease of a resistance value of the platinum resistance pattern 3 has been suppressed due to the lower layer 6a, the amount of platinum contained in the upper layer 6b is increased so that reaction of the platinum resistance pattern 3 can be suppressed more effectively. Moreover, the lower layer 6a has the notch portions 6c each positioned between adjacent ones of the meandering conductor portions 3a of the resistance pattern 3, and the upper layer 6b passes the notch portions 6c and makes tight contact with the main surface 2a of the ceramic substrate 2. Therefore, a contact area between the upper layer 6b large in the content of platinum and the ceramic substrate 2 can increase accordingly. Thus, reaction of the platinum resistance pattern 3 with impurities of the ceramic substrate 2 can be suppressed more greatly.

What is claimed is:

1. A temperature sensor element comprising:
   a ceramic substrate;
   a resistance pattern that contains platinum as a main component, and that is formed on a main surface of the ceramic substrate; and
   a protective film layer that covers the resistance pattern; wherein:
   the protective film layer includes:
   a trap layer that contains alumina as a main component, and that is formed on the main surface of the ceramic substrate so as to cover the resistance pattern; and
   an overcoat layer that contains alumina as a main component, and that is formed on the trap layer; and
   the trap layer contains 2 to 30 vol % of platinum, and the overcoat layer does not contain platinum.

2. A temperature sensor element comprising:
   a ceramic substrate;
   a surface smoothening layer that contains alumina as a main component, and that is formed on a main surface of the ceramic substrate;
   a resistance pattern that contains platinum as a main component, and that is formed on the surface smoothening layer; and
   a protective film layer that contains alumina as a main component, and that covers the resistance pattern; wherein:
   the protective film layer includes:
   a trap layer that is formed on the surface smoothening layer so as to cover the resistance pattern; and
   an overcoat layer that is formed on the trap layer; and
   both the surface smoothening layer and the trap layer contain 2 to 30 vol % of platinum, and the overcoat layer does not contain platinum.

3. A temperature sensor element according to claim 1, wherein:
   the trap layer has a two-layer structure including a lower layer and an upper layer;
   the lower layer is smaller in content of platinum than the upper layer and contains 0 to 10 vol % of platinum; and
   the upper layer contains 2 to 30 vol % of platinum.

4. A temperature sensor element according to claim 2, wherein:
   the trap layer has a two-layer structure including a lower layer and an upper layer;
   the lower layer is smaller in content of platinum than the upper layer and contains 0 to 10 vol % of platinum; and
   the upper layer contains 2 to 30 vol % of platinum.

\* \* \* \* \*